United States Patent
Barchasz et al.

(10) Patent No.: US 9,065,134 B2
(45) Date of Patent: Jun. 23, 2015

(54) LITHIUM ELECTROCHEMICAL ACCUMULATOR WITH A BIPOLAR ARCHITECTURE OPERATING ON THE BASIS OF A PAIR OF LITHIATED SULFUR COMPOUND ELECTRODES

(75) Inventors: Celine Barchasz, Fontaine (FR); Marianne Chami, Fontaine (FR); Sebastien Patoux, Saint Nicolas de Macherin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 61 days.

(21) Appl. No.: 13/704,608

(22) PCT Filed: Jun. 15, 2011

(86) PCT No.: PCT/EP2011/059949
§ 371 (c)(1),
(2), (4) Date: Dec. 20, 2012

(87) PCT Pub. No.: WO2011/157755
PCT Pub. Date: Dec. 22, 2011

(65) Prior Publication Data
US 2013/0157114 A1    Jun. 20, 2013

(30) Foreign Application Priority Data
Jun. 17, 2010    (FR) ..................................... 1054819

(51) Int. Cl.
*H01M 4/38* (2006.01)
*H01M 4/48* (2010.01)
(Continued)

(52) U.S. Cl.
CPC ............... *H01M 4/38* (2013.01); *H01M 4/483* (2013.01); *H01M 4/485* (2013.01); *H01M 4/505* (2013.01); *H01M 4/525* (2013.01); *H01M 4/581* (2013.01); *H01M 4/5815* (2013.01); *H01M 4/5825* (2013.01); *H01M 10/0418* (2013.01); *H01M 10/044* (2013.01); *H01M 10/0568* (2013.01); *Y02E 60/122* (2013.01);
(Continued)

(58) Field of Classification Search
CPC ............................. H01M 4/38; H01M 4/5825
USPC ......................................................... 429/160
See application file for complete search history.

(56) References Cited

U.S. PATENT DOCUMENTS

| 4,352,867 | A  | * | 10/1982 | Catanzarite | ................... 429/101 |
| 2004/0131944 | A1 | * | 7/2004 | Visco et al. | ................... 429/246 |
| 2005/0053842 | A1 |   | 3/2005 | Ryu et al. | |

OTHER PUBLICATIONS

Kim et al, "Comparative Study of LiNi0.5Mn1.5O4-σand LiNi0.5Mn1.5O4 Cathodes Having Two Crystallographic Structures: Fd3m and P4332", Chemistry of Materials 2004 16 (5), 906-914.*

*Primary Examiner* — Nicholas P D'Aniello
(74) *Attorney, Agent, or Firm* — Hultquist, PLLC; Mary B. Grant

(57) ABSTRACT

The invention relates to an electrochemical lithium accumulator comprising at least one first electrochemical cell and at least one electrochemical cell separated from each other by a current collector substrate, which substrate supports on a first face an electrode of said first electrochemical cell and on a second face opposite to said first face, an electrode of opposite sign of said second electrochemical cell, each cell comprising a positive electrode and a negative electrode separated by an electrolyte, characterized in that the positive electrode comprises a lithiated compound and the negative electrode comprises elemental sulfur.

16 Claims, 1 Drawing Sheet

(51) Int. Cl.
    *H01M 4/485*      (2010.01)
    *H01M 4/505*      (2010.01)
    *H01M 4/525*      (2010.01)
    *H01M 4/58*       (2010.01)
    *H01M 10/04*      (2006.01)
    *H01M 10/05*      (2010.01)
    *H01M 10/052*     (2010.01)
    *H01M 10/0568*    (2010.01)

(52) U.S. Cl.
    CPC ........... *Y02T 10/7011* (2013.01); *H01M 10/05* (2013.01); *H01M 10/052* (2013.01)

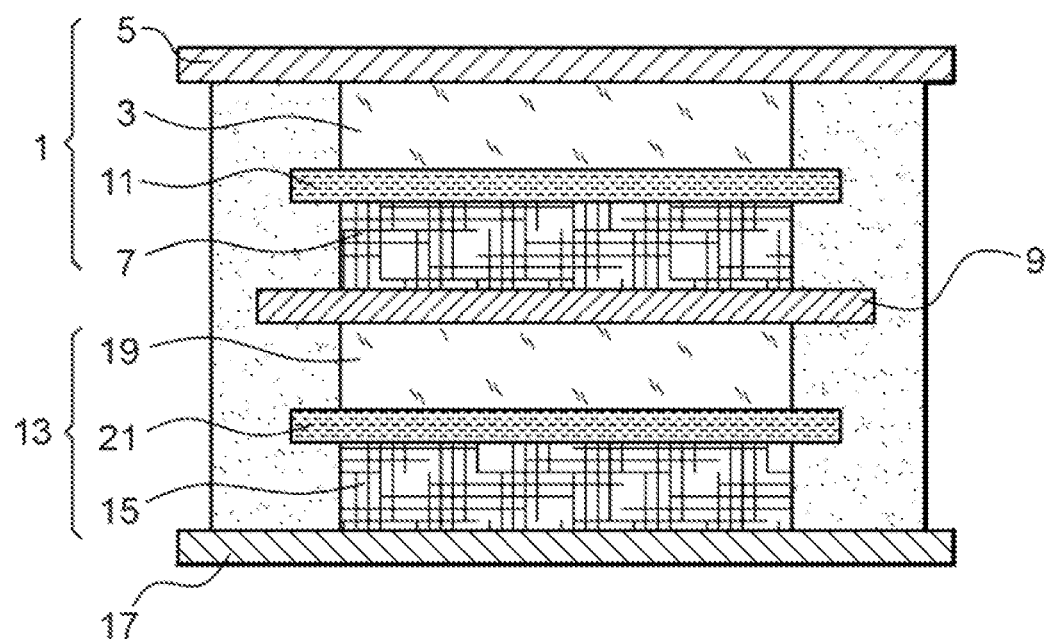

LITHIUM ELECTROCHEMICAL ACCUMULATOR WITH A BIPOLAR ARCHITECTURE OPERATING ON THE BASIS OF A PAIR OF LITHIATED SULFUR COMPOUND ELECTRODES

CROSS-REFERENCE TO RELATED APPLICATIONS

This application is a U.S. national phase under the provisions of 35 U.S.C. §371 of International Patent Application No. PCT/EP11/59949 filed Jun. 15, 2011, which in turn claims priority of French Patent Application No. 1054819 filed Jun. 17, 2010. The disclosures of such international patent application and French priority patent application are hereby incorporated herein by reference in their respective entireties, for all purposes.

TECHNICAL FIELD

The present invention relates to a lithium electrochemical accumulator with a specific so-called bipolar architecture comprising, in each electrochemical cell, a pair of specific electrodes giving the possibility, in addition to delivering a voltage, of imparting to said accumulator a large mass capacity.

The field of the invention may thus be defined as that of energy storage devices, in particular that of electrochemical accumulators.

STATE OF THE PRIOR ART

Energy storage devices are conventionally electrochemical accumulators operating on the principle of electrochemical cells capable of delivering an electric current by the presence in each of them of a pair of electrodes (a positive electrode and a negative electrode respectively) separated by an electrolyte, the electrodes comprising specific materials capable of reacting according to an oxidation-reduction reaction, in return for which there is production of electrons at the origin of the electric current and productions of ions which will circulate from one electrode to the other via an electrolyte.

The most commonly used accumulators subscribing to this principle are the following:
  Ni-MH accumulators using metal hydrides and nickel oxyhydroxide as electrode materials;
  Ni—Cd accumulators using cadmium and nickel oxyhydroxide as electrode materials;
  acid-lead accumulators using lead and lead oxide $PbO_2$ as electrode materials;
  Li-ion accumulators conventionally using totally or partly lithiated materials as electrode materials.

In the past few years, Li-ion accumulators have widely supplanted the other accumulators mentioned above because of the continuous improvement in the performances of Li-ion accumulators in terms of energy density. Indeed, lithium-ion accumulators give the possibility of obtaining much larger mass and volume energy densities (which may be greater than 180 Wh·kg$^{-1}$) than those of Ni-MH and Ni—Cd accumulators (which may range from 50 to 100 Wh·kg$^{-1}$) and acid-lead accumulators (which may range from 30 to 35 Wh·kg$^{-1}$). Furthermore, Li-ion accumulators may have a greater rated cell voltage than that of the other accumulators (for example a rated voltage of the order of 3.6 V for a cell applying as electrode materials, the $LiCoO_2$/graphite pair versus a rated voltage of the order of 1.5 V for the other aforementioned accumulators).

Because of their intrinsic properties, Li-ion accumulators therefore prove to be particularly of interest for fields where self-containment is a primordial criterion, such as this is the case in the fields of computing, video, telephone technology, transportation such as electric vehicles, hybrid vehicles or further medical, space, electronics fields.

From a functional point of view, lithium-ion accumulators operate on the principle of intercalation-deintercalation of lithium within the constitutive materials of the electrodes of electrochemical cells of the accumulator.

More specifically, the reaction at the origin of production of the current (i.e. when the accumulator is in the discharge mode) sets into play the transfer, via an lithium ion conducting electrolyte, of lithium cations from a negative electrode, which will be intercalated in the acceptor lattice of the positive electrode, while electrons from the reaction at the negative electrode will feed the outer circuit to which are connected the positive and negative electrodes.

The first lithium accumulators include lithium metal at their negative electrodes, which provided a high rated cell voltage and excellent mass and volume energy densities, with however the risk of forming lithium dendrites after repeating a certain number of cycles. These dendrites may be at the origin of deterioration of constitutive elements of the electrochemical cells which may cause short circuit phenomena.

To overcome these drawbacks, as an alternative to lithium metal, accumulators were proposed comprising an electrochemical cell including the following pair of electrodes:
  a negative electrode based on a carbonaceous material, such as graphite;
  a positive electrode based on a lithiated transition metal oxide of the $LiMO_2$ type, wherein M designates Co, Ni, Mn.

However, because of the use of graphite for making up the negative electrodes, such accumulators do not have an optimum power behavior.

To overcome this drawback, replacement of graphite with a lithiated material, in particular with lithiated titanium oxide $Li_4Ti_5O_{12}$ was proposed. This however causes a reduction in the rated cell voltage (the latter passing from 3.6 V to 2.5 V), therefore causing a reduction in the energy density of the single-cell accumulator.

In order to produce an accumulator with this type of negative electrode material while retaining an energy density comparable with that of accumulators using graphite, the idea is to produce an accumulator comprising a plurality of electrochemical cells mounted in series, in order to increase the overall voltage of the accumulator, while seeking limitation of the mass and of the volume of the latter.

A suitable architecture for putting electrochemical cells in series, without being detrimental to the mass and to the volume of the resulting accumulator, is the so-called <<bipolar>> architecture, consisting of stacking several electrochemical cells separated from each other with a current collector substrate, one face of this substrate being occupied by an electrode of a cell while the opposite face of the substrate is occupied by an electrode of opposite sign of an adjacent cell. With this type of architecture it is possible to reduce the electric resistance of the assembly as compared with one accumulator which would consist of a plurality of cells connected together through outer connectors.

This bipolar architecture also allows limitation of unnecessary masses and volumes.

On the basis of this architecture, the authors of the present invention propose setting into place a novel type of lithium accumulator which would not have any risk of degradation of the constitutive elements of the accumulator by formation of lithium metal dendrites and which furthermore would have a strong mass capacity.

DISCUSSION OF THE INVENTION

The authors of the present invention have thus surprisingly discovered that by using a specific pair of electrodes, it becomes possible to obtain an accumulator having the aforementioned advantages.

Such an accumulator corresponds to a lithium electrochemical accumulator comprising at least one first electrochemical cell and at least one second electrochemical cell separated from each other by a current collector substrate, which substrate supports on a first face an electrode of said first electrochemical cell and on a second face opposite to said first face an electrode of opposite sign of said second electrochemical cell, each cell comprising a positive electrode and a negative electrode separated by an electrolyte, characterized in that the positive electrode comprises a lithiated compound and the negative electrode comprises elemental sulfur.

Before giving more details in the discussion of this invention, we specify the following definitions.

By positive electrode, is conventionally meant, in the foregoing and in the following, the electrode which acts as a cathode, when the accumulator outputs current (i.e. when it is in a discharge process) and which acts as an anode when the accumulator is in a charging process.

By negative electrode, is conventionally meant, in the foregoing and in the following, the electrode which acts as an anode, when the accumulator outputs current (i.e. when it is in a discharge process) and which acts as a cathode when the accumulator is in a charging process.

By elemental sulfur, is meant the element sulfur not combined with one or several chemical elements.

By lithiated compound, is meant a compound comprising the lithium element combined with one or several chemical elements.

The innovation of the invention inter alia lies in the design of an accumulator with a bipolar architecture comprising, at the constitutive negative electrodes of the electrochemical cells, elemental sulfur (this element being more commonly used for entering the composition of a positive electrode) so as to benefit from the advantages inherent to the use of elemental sulfur and to have the elemental sulfur present in the negative electrode associated with a lithiated compound present in the positive electrode, the overall electrochemical reaction during the discharge of the accumulator (and also during the charge of the accumulator) not forming any lithium metal, which may be materialized under the aspect of lithium metal dendrites which are bothersome for the safety of the accumulator.

In particular, the use of elemental sulfur gives the possibility of obtaining an accumulator having a significant mass capacity (the specific capacity of sulfur being 1,675 mAh·$g^{-1}$).

In the negative electrode, the elemental sulfur may be added to other elements, such as carbon in different forms. Thus, the constitutive material of the negative electrodes may be a composite material comprising elemental sulfur and carbon.

Furthermore, the overall voltage of the accumulator may be adapted to the targeted application by acting on the number of electrochemical cells of the accumulator, while maintaining compactness of interest for portable applications thanks to the bipolar architecture.

As an example of lithiated compounds which may enter the composition of the positive electrodes of the accumulators of the invention, mention may be made of polyanionic lithiated compounds of transition metals, lithiated transition metal oxides and mixtures thereof.

As examples of polyanionic transition metals lithiated compounds, mention may be made of lithiated compounds fitting the following general formula:

$$Li_xM_y(XO_2)_n$$

wherein:
  M represents an element selected from Mn, Fe, Co, Ni, Cu, Mg, Zn, V, Ti, Al, Si, B, Cr, Mo and mixtures thereof;
  X represents an element selected from P, Si, Ge, S, V and As;
  x, y, z and n are integers or positive decimal numbers selected in such a way that the total charge of the cations compensates for the total charge of the anions, so that the compound is electrically neutral.

Preferably, M represents an element selected from Mn, Fe, Co, Ni, Cu, V, Ti, B, Cr, Mo and mixtures thereof.

More specifically, such compounds may correspond to the case when X corresponds to the phosphorus element P in which case these compounds form a lithium phosphate compound. Such compounds may for example be $LiFePO_4$ or $Li_3V_2(PO_4)_3$.

As examples of lithiated oxide compounds of transition metals, mention may be made of the compounds of the following formula:

$$LiMO_2$$

wherein M is an element selected from Ni, Co, Mn, Al and mixtures thereof.

As examples of such oxides, mention may be made of lithiated oxides $LiCoO_2$, $LiNiO_2$ and mixed oxides Li(Ni, Co, Mn)$O_2$ (such as $Li(Ni_{1/3}Mn_{1/3}Co_{1/3})O_2$) also known under the name of NMC), Li(Ni, Co, Al)$O_2$ (such as $Li(Ni_{0.8}Co_{0.15}Al_{0.05})O_2$ also known under the name of NCA) or Li(Ni, Co, Mn, Al)$O_2$.

In particular, the $Li(Ni_{0.8}Co_{0.15}Al_{0.05})O_2$ and $Li(Ni_{1/3}Mn_{1/3}Co_{1/3})O_2$ oxides give the possibility of attaining similar or substantially higher electrochemical performances than the oxides of the $LiMO_2$ type (with M representing a single metal and not a mixture) for an equal or lesser cost and improved total stability in particular in the charged condition.

As examples of lithiated oxides, mention may also be made of lithiated oxides comprising manganese and/or aluminium.

More specifically, these may be oxides fitting the following formula:

$$Li_{1-a}Ni_{0.5-b}Mn_{1.5-c}O_{4-d}$$

with a, b, c and d being comprised between −0.1 and +0.1, i.e. each of the parameters a, b, c and d is greater than or equal to −0.1 and less than or equal to +0.1.

In particular, a lithiated oxide according to this definition and particularly advantageous is the oxide of formula $LiNi_{0.5}Mn_{1.5}O_4$, which has the particularity of having an insertion/deinsertion potential for lithium of the order of 4.7 V (this potential being expressed based on the reference pair $Li^+/Li$).

Mention may also be made, as lithiated oxides comprising manganese, of the lithiated oxides of formulas $LiMn_2O_4$ or $LiNiMnO_4$.

Advantageously, the positive electrode comprises $LiFePO_4$, this material being notably intrinsically safe, because of its thermal and electrochemical stability. Furthermore, this material is not toxic and is inexpensive, its synthesis may be achieved from inexpensive and abundant raw materials.

As mentioned above, the current collector substrate supports on a first face an electrode of said first electrochemical cell and, on a second face opposite to said first face, an electrode of said second electrochemical cell, which in other words means that the current collector substrate supports on a first face a positive electrode of said first electrochemical cell and on a second face opposite to said first face, a negative electrode of said second electrochemical cell or vice versa.

In the scenario of the accumulators of the invention, it is thus necessary that the constitutive material of the current collector substrate should be stable both towards the elemental sulfur entering the composition of the negative electrode and towards the lithiated compound entering the composition of the positive electrode.

A current collector substrate according to the invention and meeting the aforementioned stability conditions is advantageously a substrate in aluminium and/or aluminium alloy.

By means of the pair of constitutive electrodes of the electrochemical cells of the accumulators of the invention, it is not necessary to resort to current collector substrates of complex structure, such as this may be the case of accumulators with bipolar architecture of the prior art, wherein, for reasons of stability towards the electrode materials, the current collector substrate has a two-face structure, wherein each face consists of a material distinct from that of the other face.

Furthermore, it is not necessary to resort to substrates in other metal elements, such as conventionally used copper substrates.

The possibility of using aluminium or an aluminium alloy for forming the current collector substrate has the advantage of giving the possibility of obtaining lithium accumulators having a significant mass energy density, notably because of the low density of aluminium (which may be evaluated as being 2.699 g/cm$^3$).

As for the electrolyte present between the positive electrode and the negative electrode of each electrochemical cell, it is preferably a liquid electrolyte comprising a lithium salt.

Thus, for example, the liquid electrolyte may include a solvent or a mixture of solvents of the carbonate type, such as ethylene carbonate, propylene carbonate, dimethyl carbonate or diethyl carbonate, and/or a solvent or a mixture of solvents of the ether type, such as dimethoxyethane, dioxolane, dioxane, tetraethyleneglycol dimethylether (known under the acronym of TEGDME) and mixtures thereof, in which a lithium salt is dissolved.

As examples, the lithium salt may be selected from the group formed by $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide $LiN[SO_2CF_3]_2$ (known under the acronym of LiTFSI) and mixtures thereof.

The aforementioned liquid electrolyte in the electrochemical cells of the accumulators of the invention, may be led to impregnate a separator, which is positioned between the positive electrode and the negative electrode of the electrochemical cell.

This separator may be in a porous material, such as a polymeric material, capable of receiving the liquid electrolyte in its porosity.

The electrolyte may also be a solid electrolyte, such as a polymeric electrolyte comprising a lithium salt.

As an example, the polymer may comprise poly(acrylonitrile), poly(ethylene oxide), poly(vinylidene fluoride), a vinylidene fluoride-hexafluoropropylene copolymer or another polymer made to be ion conducting by gelling in the presence of a liquid electrolyte. Lithium salt may fit the same definition as the one given earlier.

A specific accumulator according to the invention is an accumulator for which, for each cell, the positive electrode comprises $LiFePO_4$, the negative electrode comprises elemental sulfur.

The use of this pair of electrodes for entering the composition of the electrochemical cells of the accumulators of the invention is particularly advantageous, since, whether this be for elemental sulfur or for $LiFePO_4$, both of these materials are intrinsically safe and are also inexpensive, which may prove to be of high interest for developing electric vehicles which require reliable and inexpensive accumulators.

When the first cell and/or the second cell is located at the end of the accumulator (i.e. it forms the cell located at the end of the stack), this first and/or second cell, in addition to an electrode deposited on one face of a current collector substrate, the opposite face of which is occupied by an electrode of opposite sign of the adjacent cell, contains an electrode of opposite sign deposited on a first face of a current collector substrate, the face opposite to said first face not being occupied by an electrode of an adjacent cell, considering that said first cell and/or the second cell forms the last cell of the stack. The current collector substrate, a single face of which is occupied by an electrode may also be advantageously in aluminium or aluminium alloy. The accumulators according to the invention are particularly suitable for products requiring compact integration architectures (such as onboard systems, self-contained systems), where substantial energy is required. This type of requirements may encountered in the fields of products requiring a standalone power supply, as this is the case of the fields of computing, video, telephone technology, transportation such as electric vehicles, hybrid vehicles or further medical, space, microelectronics fields.

The invention will now be described with reference to the particular embodiment defined below with reference to the appended figures.

SHORT DESCRIPTION OF THE DRAWINGS

The single FIGURE represents an accumulator according to the invention according to a particular embodiment.

DETAILED DISCUSSION OF PARTICULAR EMBODIMENTS

The example shown below illustrates the preparation of an accumulator according to the invention illustrated in the appended single FIGURE, this accumulator consisting of a stack of a first electrochemical cell and of a second electrochemical cell separated by a so-called <<bipolar>> current collector substrate in aluminium, each cell respectively comprising a negative electrode comprising elemental sulfur and a positive electrode comprising $LiFePO_4$ separated by an electrolyte comprising a lithium bistrimethyl sulfonylimide salt in a mixture of two ether solvents.

1) Making the Positive Electrode, a So-Called <<Peripheral Positive Electrode>>

A positive electrode of the following composition:
80% by mass of $LiFePO_4$;
10% by mass of super P carbon black;
10% by mass of polyvinylidene fluoride (PVDF)
is prepared according to the following procedure:
weighing $LiFePO_4$ and carbon black powders separately;
preparing a solution of N-methyl-pyrrolidone (NMP) comprising PVDF;

gradually adding into said solution the aforementioned powders while proceeding with mixing with mechanical stirring;

after obtaining a homogeneous mixture, coating by means of a micrometric doctor blade, a face of an aluminium sheet with a thickness of 20 μm with said mixture so as to obtain a layer having a thickness of 200 μm;

first drying of the thereby deposited layer in an oven at 55° C. for 24 hours, so as to obtain evaporation of NMP;

second drying of the layer at 80° C. for 48 hours, in order to remove any trace amounts of residual water, in return for which the resulting layer forms the positive electrode.

2) Making the Negative Electrode, a So-Called <<Peripheral Negative Electrode>>.

A negative electrode of the following composition:
80% by mass of elemental sulfur;
10% by mass of super P carbon black;
10% by mass of polyvinylidene fluoride (PVDF)
is prepared according to the following procedure:

weighing the elemental sulfur and carbon black powders separately;

preparing a solution of N-methylpyrrolidone (NMP) comprising the PVDF;

gradually adding into said solution the aforementioned powders while proceeding with mixing by mechanical stirring;

after obtaining a homogeneous mixture, coating with a micrometric doctor blade, a face of an aluminium sheet with a thickness of 20 μm with said mixture so as to obtain a layer having a thickness of 100 μm;

first drying of the thereby deposited layer in an oven at 55° C. for 24 hours, so as to obtain evaporation of NMP;

second drying of the layer at 50° C. for 48 hours, in order to remove any trace amounts of residual water, in return for which the resulting layer forms the negative electrode.

3) Making the Substrate, a So-Called <<Bipolar Substrate>>

The bipolar substrate is made by applying the operating procedure discussed in paragraph 1) on a first face of an aluminium sheet with a thickness of 20 μm and the operating procedure discussed in paragraph 2) above on a second face of the same sheet, this second face being opposite to said first face.

4) Making the Stack

After cutting them out to the selected format, the electrodes prepared according to the procedures discussed in paragraphs 1) and 2) and the bipolar substrate prepared according to the procedure discussed in paragraph 3) are compressed separately at 2 t/cm² at room temperature.

The accumulator illustrated in the single FIGURE is produced in two steps.

A first step, carried out in an uncontrolled atmosphere, consists of placing according to a configuration compliant with the one illustrated in FIG. 1, the peripheral positive electrode, the bipolar substrate and the peripheral negative electrode in two U-shaped polyethylene gaskets, leaving one face of the generator open, followed by a step for hot compression of the assembly so as to ensure the seal of the accumulator.

A second step, carried out in an inert atmosphere, consists of introducing through the open face, in both cells between the positive electrode and the negative electrode a polypropylene/polyethylene separator impregnated with a liquid electrolyte based on lithium bistrimethylsulfonylimide LiTFSI (1 mol·L$^{-1}$) in solution in a 50/50 mixture by volume of tetraethyleneglycol dimethylether (TEGDME)/dioxolane.

The open face is then closed by means of the two other polyethylene gaskets.

At the end of these different steps, a lithium electrochemical accumulator is obtained, according to what is illustrated in the single FIGURE, comprising:

a first electrochemical cell 1 comprising a peripheral positive electrode 3 comprising LiFePO$_4$ deposited on a conducting substrate in aluminium 5 and, facing it, a negative electrode 7 comprising elemental sulfur deposited on a first face of a conducting substrate in aluminium 9, said negative electrode and said positive electrode being separated from each other by a separator 11 impregnated with an electrolyte as defined above; and a second electrochemical cell 13 comprising a peripheral negative electrode 15 comprising elemental sulfur deposited on a conducting substrate in aluminium 17 and, facing it, a positive electrode 19 comprising LiFePO$_4$ deposited on a second face of said conducting substrate in aluminium 9, said second face being opposite to said first face, said negative electrode and said positive electrode being separated from each other by a separator 21 impregnated with an electrolyte as defined above.

The invention claimed is:

1. An electrochemical lithium accumulator, comprising bipolar architecture comprising at least one first electrochemical cell and at least one second electrochemical cell separated from each other by a current collector substrate, which current collector substrate supports on a first face, an electrode of said first electrochemical cell and on a second face opposite to said first face, an electrode of opposite sign of said second electrochemical cell, each cell comprising a positive electrode and a negative electrode separated by an electrolyte wherein the positive electrode comprises a lithiated compound selected from polyanionic lithiated transition metal compounds, lithiated transition metal oxides and mixtures thereof and the negative electrode comprises elemental sulfur.

2. The accumulator according to claim 1, wherein the polyanionic lithiated transition metal compounds fit the following general formula:

$$Li_xM_y(XO_2)_n$$

wherein:

M represents an element selected from Mn, Fe, Co, Ni, Cu, Mg, Zn, V, Ti, Al, Si, B, Cr, Mo and mixtures thereof;

X represents an element selected from P, Si, Ge, S, V and As;

x, y, z and n are integers or positive decimal numbers selected so that the total charge of the cations compensates for the total charge of the anions, so that the compound is electrically neutral.

3. The accumulator according to claim 2, wherein the polyanionic lithiated compounds are LiFePO$_4$ or Li$_3$V$_2$(PO$_4$)$_3$.

4. The accumulator according to claim 1, wherein the lithiated oxide compounds are compounds fitting the following formula:

$$LiMO_2$$

wherein M is an element selected from Ni, Co, Mn, Al and mixtures thereof.

5. The accumulator according to claim 1, wherein the lithiated oxide compounds are lithiated oxides comprising manganese and/or aluminium.

6. The accumulator according to claim 5, wherein the lithiated oxide compounds comprising manganese fit the following formula:

$$Li_{1-a}Ni_{0.5-b}Mn_{1.5-c}O_{4-d}$$

with a, b, c and d being comprised between −0.1 and +0.1, i.e. each of the parameters a, b, c and d is greater than or equal to −0.1 and less than or equal to +0.1.

7. The accumulator according to claim 1, wherein the positive electrode comprises $LiFePO_4$.

8. The accumulator according to claim 1, wherein the current collector substrate is in aluminium or an aluminium alloy.

9. The accumulator according to claim 1, wherein the electrolyte is a liquid electrolyte comprising a lithium salt.

10. The accumulator according to claim 9, wherein the lithium salt is selected from $LiPF_6$, $LiClO_4$, $LiBF_4$, $LiAsF_6$, $LiCF_3SO_3$, $LiN(CF_3SO_2)_3$, $LiN(C_2F_5SO_2)$, lithium bistrifluoromethylsulfonylimide $LiN[SO_2CF_3]_2$ and mixtures thereof.

11. The accumulator according to claim 9, wherein the electrolyte comprises one or several solvents from the family of carbonates and/or from the family of ethers.

12. The accumulator according to claim 5, wherein the lithiated oxide is $LiMn_2O_4$ or $LiNiMnO_4$.

13. The accumulator according to claim 5, wherein the current collector substrate is in aluminium or an aluminium alloy.

14. The accumulator according to claim 5, wherein the electrolyte is a liquid electrolyte comprising a lithium salt.

15. The accumulator according to claim 6, wherein the current collector substrate is in aluminium or an aluminium alloy.

16. The accumulator according to claim 6, wherein the electrolyte is a liquid electrolyte comprising a lithium salt.

* * * * *